United States Patent Office 3,483,091
Patented Dec. 9, 1969

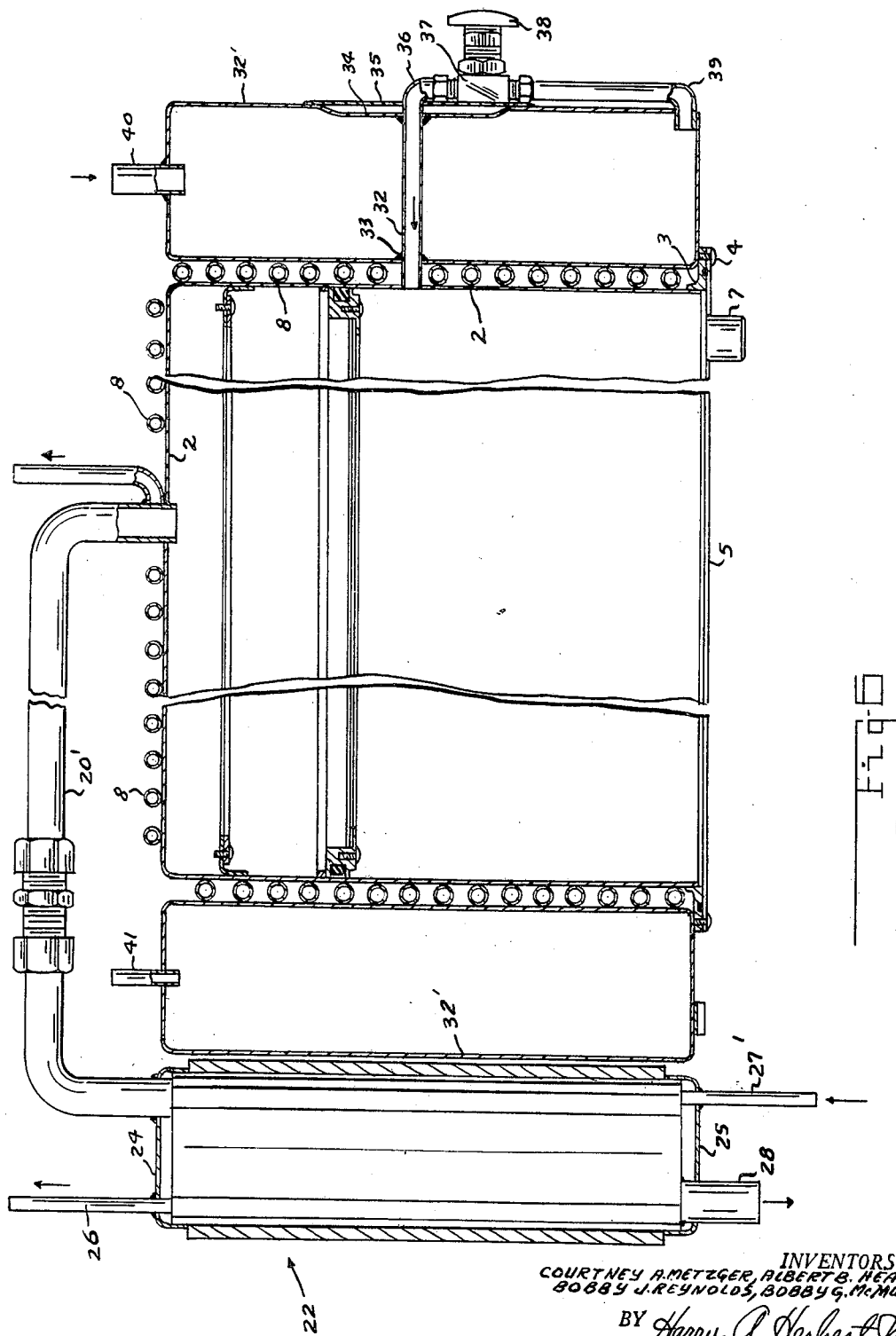

3,483,091
VACUUM DISTILLATION-VAPOR FILTERED
WATER RECOVERY APPARATUS
Courtney A. Metzger, Springfield, and Albert B. Hearld,
Bobby G. McMullen and Bobby J. Reynolds, Dayton,
Ohio, assignors to the United States of America as
represented by the Secretary of the Air Force
Filed Jan. 3, 1968, Ser. No. 695,383
Int. Cl. B01d 3/10, 29/04; C02b 1/04
U.S. Cl. 202—182
3 Claims

ABSTRACT OF THE DISCLOSURE

An improved method and apparatus for obtaining potable water from urine and particularly adapted for space vehicles although not limited thereto. The apparatus comprises an evaporator formed of a cylindrical container surrounded on the top and along the periphery with tubing which can carry a heated fluid to raise the temperature of the contents of the evaporator, if necessary. An improved filtering structure is positioned within the container and a bed of granular carbon is located above the filter. A condenser is in communication with the space above the carbon bed; the condenser being formed of a closed cylinder containing a cooling coil. The cylinder is connected to a controlled source of vacuum which also serves to evacuate the evaporator containing the urine.

---

All of the parts, except the tubing and filters, are made of stainless steel. When the apparatus is employed in a space vehicle, so that sources of vacuum and coldness can be derived from outer space, there are no moving parts in the apparatus. Moreover, the ruggedness of construction and the character of the apparatus are such that the entire distillation plant can operate even when it is tipped many degrees from the vertical position, thus lending itself to the erratic movements of a space capsule.

BACKGROUND OF THE INVENTION

The invention relates to an improved method and apparatus for extracting potable water from liquid containing solid material in suspension or solution.

In space vehicles, it is essential that the last ounce of excess weight be eliminated, not only for the reason of reducing the weight to be put into orbit but also in maintaining the desired orbit and maneuverability within that orbit. Drinking water is an essential element and when one or more astronauts are confined in a capsule for an extended period, the amount of water consumed and used for daily tasks about the craft becomes considerable. It is therefore necessary that the water supply be conserved to the utmost and also that the supply taken on board be limited to the absolute minimum. The water supply, even though a necessity, constitutes dead weight which must be reckoned with in determining the power required for lift-off.

Various methods and apparatus have been proposed to purify and render water potable which has been extracted from urine containing unwanted solids so that the water can be used over again. However, prior apparatus of this character is not only bulky and heavy but also has to rely on an abundant source of heat, such as gas, which is available only at ground level. Such apparatus therefore is united to the peculiar requirements of the space vehicle.

SUMMARY OF THE INVENTION

An object of the invention is to provide an improved method and apparatus for recovering potable water from human waste, soapy or cleansing water, and which is eminently suited for space vehicles but is equally adapted for use on land and even on a commercial scale.

Another object is to provide a reliable process and apparatus for recovery of potable water from urine and having aerospace and earth surface application.

Another object is to provide a dependable vacuum distillation apparatus for the recovery of potable water from urine and other body wastes and when serving in space vehicles in orbit, requires no moving parts, no chemicals, no external source of heat, and no mechanical source of coldness, and especially one having the minimum weight and bulk.

Still another object is to provide an improved device of the type mentioned which has utility, not only in the field of aerospace at which it has its greatest adaptability, but with some modifications, the installation can be used on land in which case outside sources of energy of any desired type and amount may be employed to increase the potable water output.

The above objects are attained in brief, by vacuum distilling the urine at relatively low temperatures and pressures, passing the vapors through a selectively permeable micro-porous membrane and condensing the vapors. The apparatus has been improved in such manner that the energy necessary for distillation, also to obtain the required temperature, the vacuum conditions and condensation can be found within the confines of the space vehicle or provided by the immediate external surroundings of the vehicle when in flight. Consequently, very little added weight is incurred by the apparatus itself.

Other objects and features will be apparent as the specification is perused in connection with the accompanying drawings.

BRIEF DESCRIPTION OF THE DRAWINGS

FIG. 6 represents a modified form of the distillation apparatus as a whole.

DESCRIPTION OF THE PREFERRED EMBODIMENT

Figure 1:
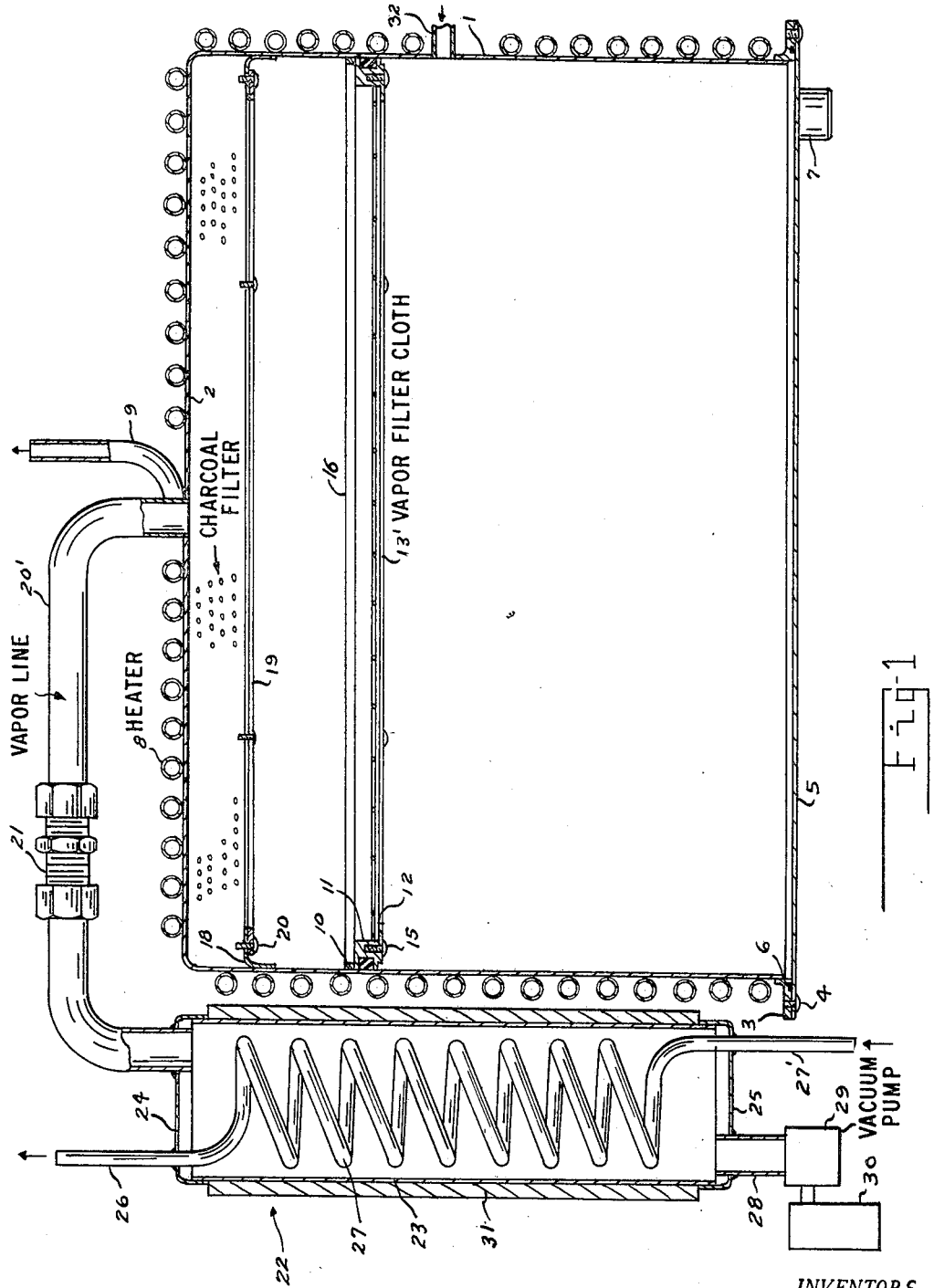
FIG. 1 is a vertical section of the improved distillation apparatus, but showing the condenser and some of the connecting pipes in elevation. The section is taken along line 1—1 in FIG. 2.
Figure 2:
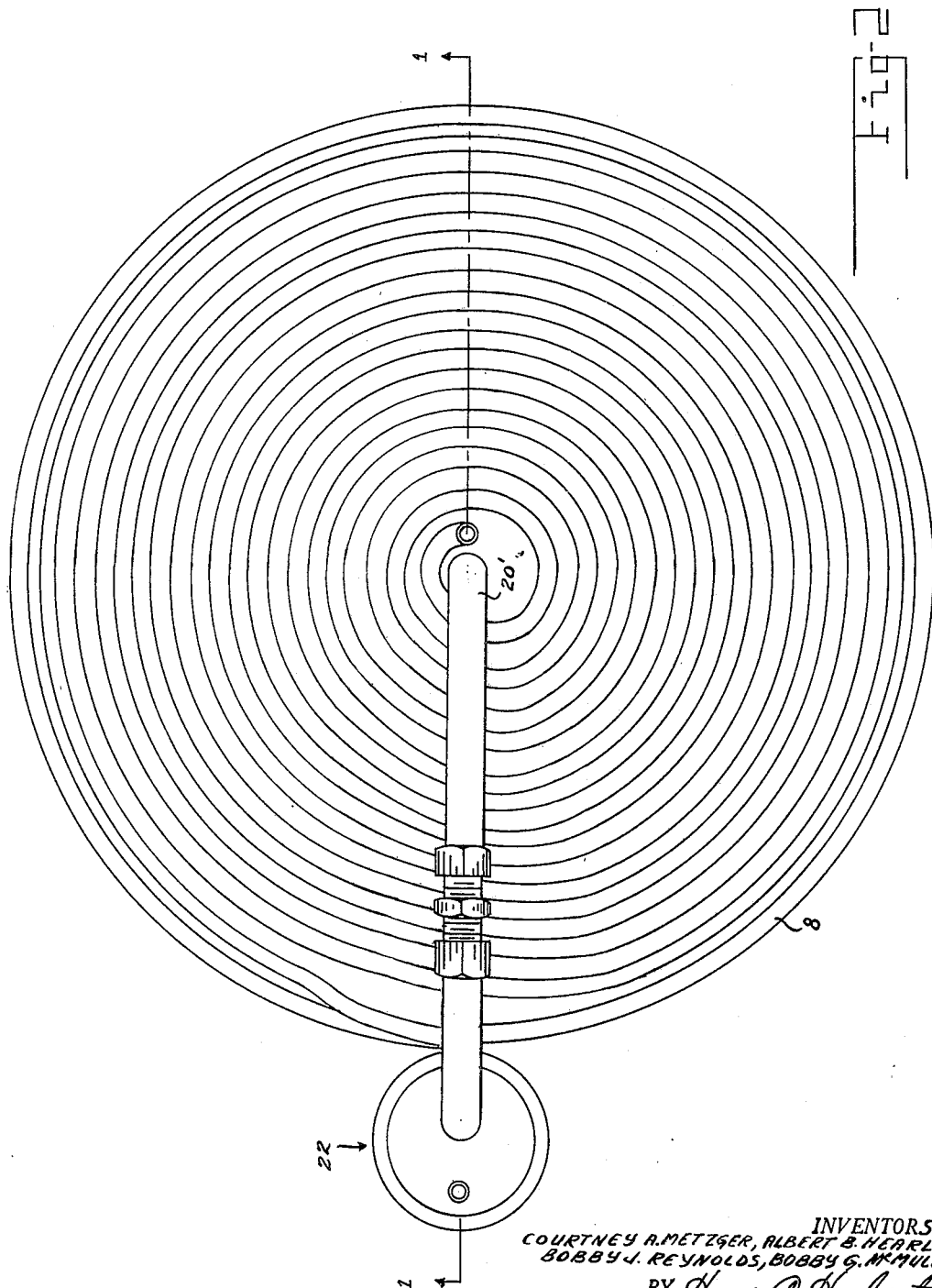
FIG. 2 represents a top plan view of the apparatus.

Referring to FIG. 1, reference character 1 designates an upturned pot or container of round configuration and preferably made of stainless steel. The top 2 of the pot is closed and is flat throughout its area. A ring-like flange 3 is welded to the lower outside edge of the container to which is secured, as by screws 4, a bottom plate 5 also made of stainless steel. A sealing ring 6 is pressed into a groove in the flange to render the closure airtight. A sealed drainage plug 7 may be provided in the bottom plate. About the upper surface 2 and down along the side of the container there is a number of convolutions of tubing 8, preferably of copper and about ¼" in diameter.

The winding starting at the center indicated at 9 proceeds outwardly in turns of increasing diameter until the edge of the container is reached. The convolutions continue over the edge and downwardly along the external periphery of the container. The convolutions are kept fairly close together or at least equally spaced from one another in order to obtain the longest length of tubing possible over a particular area. The turns of the tubing are soldered or otherwise secured in place. The upper and lower ends of the tubing are connected to a heating fluid which preferably enters the coil at the bottom and is returned to the heat source or to a drain from the end of the tubing at the top.

When the distillation apparatus is used on land, this heat source may conveniently constitute an electrical heater. However, when the apparatus is used in a space capsule, the heat may be obtained from any source that is normally wasted, such as a heated reactor, a space radiator which derives its energy from the sun, or the heat obtained from electrical equipment or even from isotopes which are normally carried on a modern spacecraft. The purpose of heating the contents of the container will be explained hereinafter.

Figure 3:
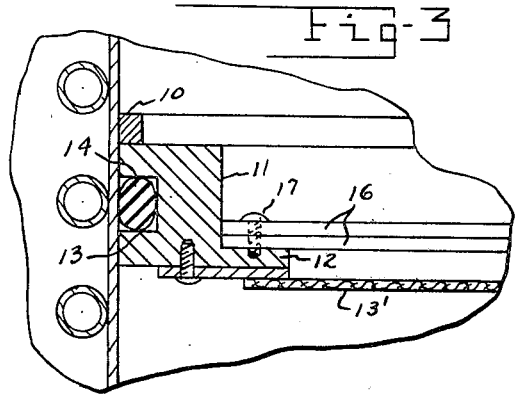
FIG. 3 is a nenlarged fragmentary view of the support by which the filter structure is held in position.

Within the container there is an annular metal ring 10 (FIGS. 1 and 3) positioned about one-quarter down from the top of the container. The ring may be soldered to the container. A thicker and wider ring 11 may abut the ring 10 along its edge, the ring 11 having an inwardly extending flange 12. The ring 11 is provided with a peripherally extending groove 13 which receives a sealing ring 14 so that the ring 11 can be held in position against the ring 10 solely by the friction of the sealing ring 14. The ring 11 serves as a support for a circular piece of filter cloth 13'. This cloth may be constituted of woven fiberglas strands coated with Teflon and having 5-micron openings. cloth of this character is procurable on the open market under the name Pallflex TV 20-A-60 and is characterized by restraining the passage of substantially all the contaminating material in the vapor or water. The filter cloth member is affixed in a stretched condition to a metal ring 14' by screws 15 equally spaced about the outer boundary of the ring.

Figure 4:
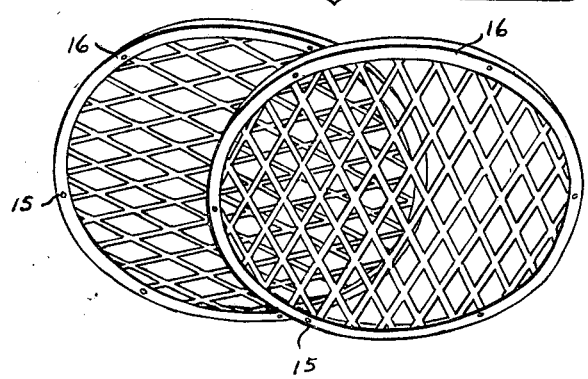
FIG. 4 is a perspective view of a pair of grilles or grates positioned at the back of the filter.
Figure 5:
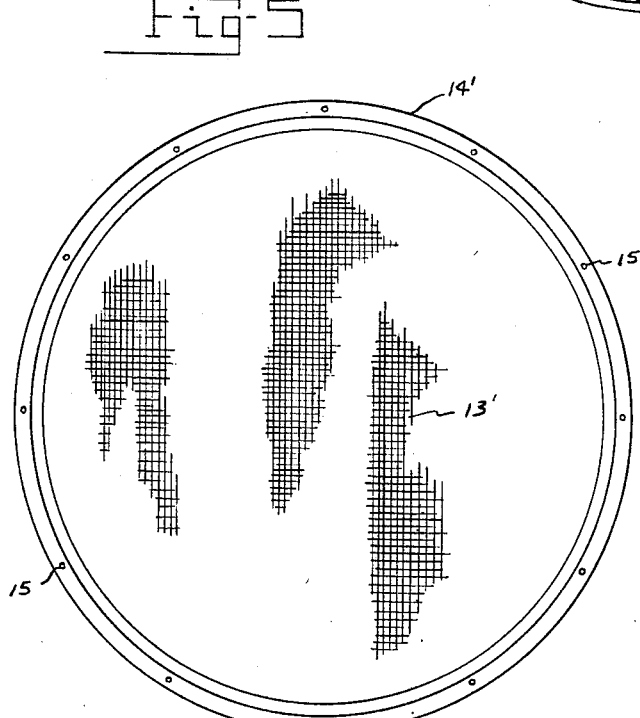
FIG. 5 illustrates a view of the filter element ready to be installed.

In order to prevent any undue distortion of the filter cloth in the upward direction during operation, we provide a pair of gratings or grilles 16 positioned over the filter. These gratings are shown in FIG. 4 and consist of disks of metal with diamond-shaped openings, except around the outer edge, stamped out to leave narrow interconnecting bars which criss-cross one another. The solid boundary portion of each grating is provided with holes to receive the screws 17 (FIG. 3) for fastening to the flange 12. The gratings are in abutting relation and one grating is turned 90° from the other so that the diamond-shaped openings are not coincident with one another. The combination of the cloth 13' and the backing gratings constitute a highly efficient filter assembly which can be removed as a whole from the container for cleaning purposes or replacement of the cloth. While we have shown only one filter assembly, it is obvious that more than one may be used in which case the second assembly would be positioned about half-way between the first assembly and the top of the container, assuming that a second locating ring 10 is provided.

It is desirable that a bed of activated carbon granules be positioned between the filter assembly and the top of the container. For this purpose, a ring 18 having a rounded downwardly extending flange is fitted tightly within the container and preferably soldered thereto. A fairly coarse screen 19 of circular configuration is fitted against the underneath flat portion of the ring and secured thereto at certain positions near the edge as indicated at 20. The space between the top of the container and the screen is filled with activated charcoal in granulated form. It is necessary that the granules be at least slightly larger than the openings in the screen 19 so as not to drop through and contaminate the filter cloth. The purpose of the charcoal is to remove any odors from the vapor which passes upwardly through the container and also to retain any foreign particles which would otherwise leave the container.

A bent pipe 20' of considerable size is secured to the top of the container and communicates with the interior thereof. It includes a sealed coupling 21 of any suitable and well-known type and extends into an airtight container generally designated at 22. The latter represents part of a condenser for liquifying the vapor flowing from the top of the container through the pipe 20'. The container 22 may comprise a cylinder 23 of metal, closed and sealed at both ends by metal caps 24, 25. The upper cap contains openings to receive the pipe 20' and also to receive a smaller pipe forming part of the copper coil 27 which extends the length of the cylinder 23. An inlet pipe for the coil is brought through the lower cap 25. The latter has an additional opening to accommodate a pipe 28 which serves as a vapor outlet. This pipe is connected to a source of vacuum 29 which may constitute a pump. However, in the case of a space vehicle travelling in orbit, a pipe reaching out into space and provided with a control valve would serve as a suitable source of vacuum. A water storage container 30 may be connected to the pump.

The wall of the cylinder 23 is heat insulated by means of a thick covering 31 closely surrounding the container and extending the entire length thereof. The covering may be constituted of a super-insulating material such as fiberglas. The condenser 22 can be secured to the container 1 by brackets (not shown), and preferably, sufficient space is left between the condenser and the evaporator as to reduce as much as possible the effect of any heat radiated by the container 1 and its coil 8.

The coiled tubing 27 is for the purpose of cooling and condensing the vapor within the container 23. It is supplied with cold liquid introduced at the lower end and taken out at its upper end. The cold fluid may be supplied from a jacket surrounding the evaporator (not shown) of an air conditioning unit and given the proper pressure by means of a condenser pump (not shown) of any suitable and well-known type. In a vehicle traveling through orbital space, a continuous supply of cold water can be obtained by placing a coil containing water overboard, which coil forms part of a closed circulatory system and is branched off through a valve (not shown) to the condenser coil 27. The space outside the vehicle is tremendously low in temperature. The water obviously is not wasted as it merely circulates through the condenser coil and is returned to the outer space for re-cooling. Some vehicles have an external cooling coil built in as a streamlined structure so as not to introduce frictional effects.

OPERATION OF THE APPARATUS

The purpose of the apparatus is to obtain potable water without peculiar taste, or unusual color, and without odor, from liquids such as urine, perspiration or other waste liquid which contain solids of various sizes and chemical attributes. The urine is caused to flow into the lower half of the container 1 through a pipe 32. The urine is normally at body temperature at about 98° F. and if additional heat becomes necessary, hot water may be introduced at the lower end of the coiled tubing 8. If the apparatus is used in a space vehicle, such heat may be abstracted from a water jacket (not shown) employed in an air-conditioning or heating system, or from any source of waste heat normally found in the vehicle. While the contents are being heated, the source of vacuum 29 is made effective and the space within the container 23 and all free space in the container 2 is evacuated through pipe 20' to a preferred pressure of about 32 mm. Hg or less which is the preferred amount, although not limited thereto. Assuming that the temperature of the liquid is about 86° F., the urine will commence to boil under this vacuum and the vapors liberated by the liquid will be caused to move upwardly by the suction exerted at 29. The vapor passes through the filter cloth and then through the bed of charcoal granules. In general, the higher the vacuum made available by the pump 29, the less temperature is needed to cause the urine to boil and vice versa.

It is obvious that if the pump were able to provide a vacuum of about 50 mm. Hg and assuming that the urine remains for a reasonable length of time at body heat of 98° F., no extra heat would be necessary to arrive at the boiling temperature of the urine. The fine filter serves to extract practically all of the solids from the vapor and after passing through the charcoal any and all extraneous particles, of whatever nature, size, shape or content are completely removed, leaving vapor of extremely high purity which passes through the pipe 20'. The vapor upon reaching the container 23 and striking the cold coiled pipe 27 is caused to condense. The water is drawn off by the condenser pump 29 which passes it on to the storage container 30.

The chemical content of a number of samples, furnished by applicants, of the water extracted from various samples of urine by the improved apparatus is shown in the cataloged material on the following pages and identified as Sheet Nos. 1, 2, 3, 4, 5 and 6. These tests and results are believed to be self-explanatory. They extended over a period of several months and the analyses were prepared in some cases by independent analytical chemists, and in all cases, in accordance with the requirements set forth in "Standard Methods for the Examination of Water and Waste Water" published by the American Public Health Association, Inc., of New York. A comparison is shown in Sheets 1 through 5 (last column) with respect to an analysis conducted by the Public Health Department of acceptable drinking water with regard to such contents as are made available to the public. In practically every case, the water extracted from urine by the apparatus shown and described herein favorably compares with, and in some cases, excels over the drinking water standards. The extracted liquid is tasteless, colorless and without the slightest trace of odor, even in the case of the raw liquid which was left standing for ten days as shown in next to the last column of Sheets 1 through 5.

A modified form of the improved apparatus is shown in FIG. 6. The main difference in the structure comprises the use of an annular compartment or chamber 32' made of thin stainless steel and closely surrounding the vertical portion of the coil 8. The compartment is of approximately the same height as the container 2 and is of considerable width. The bottom of the compartment is held against the coil 8 by extending the width of the flange 3 from that shown in FIG. 1 and permitting the screws 4 to secure the cover 5, also to enter the material of the compartment. The latter is held at the middle by a pipe 32

ANALYTICAL RESULTS.—SHEET NO. 1

| Sample No | | 286 | 287 | 289 | 290 | 291 | 292 | 293 | 297 | 298 | 299 | 300 | 350 ml. mixed from each day of 10-day run | U.S. Public Health, drinking water standards 1966 |
|---|---|---|---|---|---|---|---|---|---|---|---|---|---|---|
| | | | | | Spectrographic data (p.p.b.) | | | | | | | | | |
| 1 | Zinc | <5 | <5 | <5 | <5 | 23 | 8 | 10 | <5 | <5 | 13 | <5 | <8 | 5,000 |
| 2 | Cadmium | <5 | <5 | <5 | <5 | <5 | <5 | <5 | <5 | <5 | <5 | <5 | <3 | 10R |
| 3 | Boron | 63 | 100 | 60 | 18 | 21 | 5 | <5 | 70 | 14 | 6 | 9 | 155 | — |
| 4 | Phosphorus | <20 | <20 | <20 | 55 | 100 | <25 | 55 | <20 | <20 | 55 | 150 | <18 | — |
| 5 | Iron | <5 | <5 | <5 | <3 | 10 | 13 | 10 | 6 | 9 | 12 | 8 | <2 | 300 |
| 6 | Molybdenum | <10 | <10 | <10 | <10 | <10 | <10 | <10 | <10 | <10 | <10 | <10 | <6 | — |
| 7 | Manganese | <2.5 | <2.5 | <2.5 | <2.5 | <2.5 | <2.5 | <2.5 | <2.5 | <2.5 | <2.5 | <2.5 | <1.5 | — |
| 8 | Aluminum | <10 | <10 | <10 | <10 | <10 | <10 | 75 | <10 | <10 | <10 | <10 | <6 | — |
| 9 | Beryllium | <.02 | <.02 | <.02 | <.03 | <.03 | <.03 | <.03 | <.03 | <.03 | <.03 | <.03 | <.02 | — |
| 10 | Copper | <3 | <3 | <3 | 3 | <3 | <3 | <3 | <3 | <3 | 9 | 4 | <2 | 1,000 |
| 11 | Silver | <.5 | <.5 | <.5 | <.5 | <.5 | <.5 | <.5 | <.5 | <.5 | <.5 | <.5 | <.3 | 50R |

— Means no data.  0 Means none.  + Means extremely slight.

ANALYTICAL RESULTS.—SHEET NO. 2

| Sample No | | 286 | 287 | 289 | 290 | 291 | 292 | 293 | 297 | 298 | 299 | 300 | 350 ml. mixed from each day of 10-day run | U.S. Public Health, drinking water standards 1966 |
|---|---|---|---|---|---|---|---|---|---|---|---|---|---|---|
| | | | | | Spectrographic data (p.p.b.) | | | | | | | | | |
| 12 | Nickel | <5 | <5 | <5 | <5 | <5 | <5 | <5 | <5 | <5 | <5 | <5 | <3 | — |
| 13 | Cobalt | <5 | <5 | <5 | <5 | <5 | <5 | <5 | <5 | <5 | <5 | <5 | <3 | — |
| 14 | Lead | <10 | <10 | <10 | <10 | <10 | <10 | <10 | <10 | <10 | <10 | <10 | <6 | 50R |
| 15 | Chromium | <3 | <3 | <3 | <3 | <3 | <3 | <3 | <3 | <3 | <3 | <3 | <2 | 50R |
| 16 | Vanadium | <10 | <10 | <10 | <10 | <10 | <10 | <10 | <10 | <10 | <10 | <10 | <6 | — |
| 17 | Barium | <1 | <1 | 1 | 18 | 45 | 24 | 75 | <1 | 1 | 13 | 3 | <1 | 1,000R |
| 18 | Strontium | <2 | <2 | <2 | <2 | <2 | <2 | <2 | <1 | <1 | <1 | <1 | <1 | — |
| | | | | | Cations (mg./l) | | | | | | | | | |
| 1 | Calcium (Ca) | — | — | — | <1 | <1 | <1 | <1 | — | — | — | — | — | — |
| 2 | Magnesium (Mg) | — | — | — | <.3 | <.3 | <1 | <.5 | — | — | — | — | — | — |

— Means no data.  0 Means none.  + Means extremely slight.

ANALYTICAL RESULTS.—SHEET NO. 3

| Sample No | | 286 | 287 | 289 | 290 | 291 | 292 | 293 | 297 | 298 | 299 | 300 | 350 ml. mixed from each day of 10-day run | U.S. Public Health, drinking water standards 1966 |
|---|---|---|---|---|---|---|---|---|---|---|---|---|---|---|
| | | | | | Cations (mg./l.) | | | | | | | | | |
| 3 | Sodium (Na) | — | — | — | <1 | 1.5 | 11 | 1.0 | <1 | <1 | 1.0 | 2 | <1 | — |
| 4 | Potassium (K) | — | — | — | <.5 | <.5 | .8 | <.5 | <.2 | <.2 | <.2 | 1.6 | .9 | — |
| 5 | Arsenic (As) | — | — | — | <.01 | <.01 | .018 | .02 | — | — | — | — | <25 | .05R |
| 6 | Ammonia (NH$_3$/N) | 26.3 | 8.1 | 15.6 | 3.8 | 5.6 | 3.8 | 8 | 7.5 | 11 | 17 | 11 | 2.5 | — |
| | | | | | Anions (mg./l.) | | | | | | | | | |
| 1 | Sulfate (SO$_4$) | 4 | 0 | 2 | <1 | <1 | 5 | 3 | <1 | <.1 | 28 | 5 | <.1 | 250 |
| 2 | Chloride (Cl) | 1.0 | <1 | 1.0 | <1.0 | 1.0 | 4 | 6 | 1.5 | 1.0 | 1.5 | 4 | 3 | 250 |
| 3 | Nitrate (NO$_3$/N) | — | — | — | <.1 | <.1 | <.1 | <.1 | — | — | — | — | — | 45 |

— Means no data.  0 Means none.  + Means extremely slight.

ANALYTICAL RESULTS.—SHEET NO. 4

| Sample No | 286 | 287 | 289 | 290 | 291 | 292 | 293 | 297 | 298 | 299 | 300 | 350 ml. mixed from each day of 10-day run | U.S. Public Health, drinking water standards 1966 |
|---|---|---|---|---|---|---|---|---|---|---|---|---|---|
| Anions (mg./l.) | | | | | | | | | | | | | |
| 4. Total phosphate ($PO_4$) | .08 | <.01 | .13 | 0.1 | 0.3 | 0.1 | .3 | .12 | .05 | 0.14 | .72 | <.1 | — |
| 5. A B S | — | — | — | — | — | — | — | — | — | — | — | | 0.5 |
| Other tests | | | | | | | | | | | | | |
| 1. pH | 9.3 | 9.0 | 9.6 | 8.2 | 7.3 | 7.3 | 8 | 9 | 9.1 | 6.8 | 9.2 | 7.1 | — |
| 2. Conductivity ($\mu$ mhos/cm.) | 97 | 47 | 64 | 55 | 130 | 106 | 130 | 41 | 54 | 144 | 265 | 36 | — |
| 3. Color | — | — | — | — | — | — | — | — | — | — | — | 0 | 15 |
| 4. Odor | — | — | — | + | + | — | — | + | + | + | + | 0 | 3 |
| 5. Total hardness ($CaCO_3$) | — | — | — | <1 | 4 | 6 | <1 | <1 | <1 | 6 | <1 | <1 | |

— Means no data.  0 Means none.  + Means extremely slight.

ANALYTICAL RESULTS.—SHEET NO. 5

| Sample No | 286 | 287 | 289 | 290 | 291 | 292 | 293 | 297 | 298 | 299 | 300 | 350 ml. mixed from each day of 10-day run | U.S. Public Health, drinking water standards 1966 |
|---|---|---|---|---|---|---|---|---|---|---|---|---|---|
| Other tests | | | | | | | | | | | | | |
| 6. Total alkalinity ($CaCO_3$) | — | — | — | 28 | 34 | 34 | 44 | 16 | 48 | 16 | 194 | 16 | — |
| 7. Total solids | — | — | — | — | — | — | — | — | — | — | — | — | 500 |
| 8. Chem $O_2$ demand | — | — | — | 220 | 129 | 25 | 25 | — | — | — | — | — | — |
| 9. Urea | 0 | 1.6 | 2 | <.1 | <.01 | <.1 | <.1 | Trace | Trace | Trace | ? | <1 | — |
| 10. Total plate count | — | — | — | — | — | — | — | — | — | — | — | — | — |
| 11. Total carbon | 3.8 | 8 | 2 | 64 | 40 | 4.8 | <.5 | 40 | 18 | 32 | 54 | 1.5 | — |

— Means no date.  0 Means none.  + Means extremely slight.

ANALYTICAL RESULTS.—SHEET NO. 6

| SAMPLE NO. | 1-3 | 1-4 | 2-4 | 3-4 | 4-4 | 5-4 | 6-4 | 7-4 | 8-4 | 9-4 | 10-4 |
|---|---|---|---|---|---|---|---|---|---|---|---|
| Urine processed in ml | 5,000 | 6,000 | 3,890 | 4,000 | 4,000 | 4,040 | 3,520 | 3,600 | 4,000 | 4,000 | 4,000 |
| Urine recovered in ml | 2,785 | 3,650 | 3,640 | 3,850 | 3,680 | 4,000 | 3,500 | 3,510 | 3,420 | 3,260 | 3,200 |
| Room temperature in, °F | 78 | 75 | 78 | 72 | 72 | 64 | 72 | 77 | 78 | 78 | 78 |
| Vacuum in container, 8 in mm. Hg | 51 | 46 | 45 | 48 | 46 | 38 | 45 | 59 | 48 | 55 | 55 |
| Urine temperature in, °F | 103 | 96 | 96 | 98.5 | 98 | 91 | 91 | 91 | 98 | 105 | 103 |
| Anions | | | | | | | | | | | |
| Chloride (C) in milligrams per liter | 19.9 | 2.9 | 6.9 | 2.9 | 2.9 | 1.9 | 2.9 | 1.9 | 2.9 | 18.98 | 8.99 |
| Hours of operation | 5 | 6 | 6 | 6 | 5.5 | 7 | 5.5 | 6 | 5.5 | 6 | 6 |
| Other tests | | | | | | | | | | | |
| pH | 6 | 6.7 | 7.5 | 6 | 6 | 5 | 6 | 5 | 5 | 6 | 6 |
| Conductivity ($\mu$ mhos/cm.) | 32 | 13 | 35 | 11 | 24 | 12 | 16 | 21 | 23 | 21 | 27 |
| Color | Clear | Clear | Clear | Clear | Clear | Clear | Clear | Clear | Clear | Clear | Clear |
| Odor | None | None | None | None | None | None | None | None | None | None | None |
| Urea | 0 | 0 | 0 | 0 | 0 | 0 | 0 | 0 | 0 | 0 | 0 | which is tightly fitted and perhaps welded into the side of the compartment as indicated at 33, to which it may be screwed or welded. Since the compartment 32' snugly surrounds the coil 8, very little fastening means is necessary.

The outside portion of the compartment at about the middle, may have a depression indicated at 34, in order to accommodate a weld at the pipe 32 and a flat plate 35 may be welded or soldered to the wall to cover the depressed area. The pipe 32, which conveniently is constituted of copper, passes through the compartment and is bent downwardly at 36 to include a valve body 37 of any suitable and well-known type together with a control wheel 38. The pipe continues beyond the valve and is bent inwardly, as at 39, to re-enter the compartment. A fluid inlet pipe 40 is provided at the top of the compartment. A small pipe vent 41 is also provided, preferably at a position diametrically opposite from the inlet pipe.

It is apparent that the annular compartment 32' serves as a collecting or storage chamber for the urine, apart from the container 2. Due to its long peripheral length, the chamber can accommodate large quantities of waste liquid introduced through the pipe 40, and hold this liquid apart from any that may be undergoing treatment in the container 2. When the annular chamber is employed, the condenser apparatus 22, including the cooling coil, are positioned farther away from the main container 2 than in the case of FIG. 1 so that the pipe 20' must be lengthened accordingly.

The operation of the apparatus shown in FIG. 6 is substantially the same as was described in connection with FIG. 1. However, it should be noted that when the level of the urine reaches above the pipe 32, the excess will flow into the container 2, assuming the valve 38 is open. On the other hand, if it is desired to use the chamber entirely for storage purposes, awaiting future treatment, the valve 37 is closed. In the meantime, the urine can be kept heated by the effect of heated water passing through the coil 8.

Due to the rugged construction of both forms of the apparatus and the complete absence of glass, together with the improved type of filter, it is entirely possible to tilt the apparatus during operation at a considerable angle from its normally vertical position and still maintain full operation. None of the urine will pass through the filter until it is vaporized under these conditions. The craft work where the vehicle is subject to considerable above considerations are extremely important in space-gyrations, produced manually or naturally, and in either case, usually with extreme suddenness.

While a certain specific embodiment has been described, it is obvious that numerous changes may be made without departing from the general principle and scope of the invention.

What is claimed is:

1. An evaporator comprising a closed cylinder of elongated shape and containing a readily vaporizable liquid as distill and, vapor filter cloth extending across said cylinder in the upper section thereof and out of contact with said liquid, a grating parallel to said filter cloth and in close relation thereto, a screen extending across said cylinder between the said grating and the top of the cylinder for supporting activated charcoal, a pipe leading out from the top of the cylinder for exhausting distilled vapor therefrom, means of heating said evaporator for vaporizing the liquid, said means being constituted of a plurality of turns of a coiled tubing for passing heated fluid and which closely surrounds the periphery of the cylinder, said vapor being caused to pass through said filter, grating and activated charcoal into said pipe, a condenser device for receiving at one end the vapor delivered by said pipe, a source of vacuum connected to the other end of said condenser and which communicates with the top of the cylinder through said pipe, a cooling coil extending lengthwise of said condenser for causing condensation of the vapor, a liquid collector connected to said vacuum source for receiving condensate from the condenser, a cylindrical chamber surrounding said peripherally extending tubing for storing excess liquid to be distilled, and a pipe connection between said chamber and the cylindrical evaportor, said connection being under the control of a valve which permits the stored liquid to flow into the evaporator.

2. Apparatus according to claim 1 and in which the top of the cylinder is flat throughout its area and the means for vaporizing the liquid is constituted of a plurality of turns of a coiled tubing which closely surrounds the periphery of the cylinder and extends in coiled form over the entire top thereof.

3. Apparatus according to claim 1 and in which said grating constitutes two disks of metal with diamond-shaped openings and the disks are turned such that the openings are out of coincidence with one another.

References Cited

UNITED STATES PATENTS

| | | | |
|---|---|---|---|
| 799,003 | 9/1905 | Hodges et al. | 202—10 X |
| 845,285 | 2/1907 | Wittemann | 202—205 X |
| 2,445,350 | 7/1948 | Ginnings | 202—172 |
| 3,276,848 | 10/1966 | Barr et al. | 202—205 |
| 3,303,105 | 2/1967 | Konikoff et al. | 203—11 |
| 3,340,186 | 9/1967 | Weyl | 203—11 X |
| 3,359,182 | 12/1967 | Williamson | 202—189 |
| 3,373,088 | 3/1968 | Harkee et al. | 203—11 X |
| 3,405,058 | 10/1968 | Miller | 210—23 |
| 3,415,038 | 12/1968 | Merten et al. | 55—16 |

NORMAN YUDKOFF, Primary Examiner

F. E. DRUMMOND, Assistant Examiner

U.S. Cl. X.R.

202—200; 203—11; 210—23